US011872794B2

United States Patent
Zhou et al.

(10) Patent No.: US 11,872,794 B2
(45) Date of Patent: Jan. 16, 2024

(54) SHEET PRODUCTION LINE

(71) Applicant: QINGDAO SANYI PLASTIC MACHINERY CO., LTD. (CN), Qingdao (CN)

(72) Inventors: Yuliang Zhou, Qingdao (CN); Chenggong Liu, Qingdao (CN)

(73) Assignee: QINGDAO SANYI PLASTIC MACHINERY CO., LTD. (CN), Qingdao (CN)

( * ) Notice: Subject to any disclaimer, the term of this patent is extended or adjusted under 35 U.S.C. 154(b) by 12 days.

(21) Appl. No.: 17/586,603

(22) Filed: Jan. 27, 2022

(65) Prior Publication Data
US 2022/0410553 A1 Dec. 29, 2022

(30) Foreign Application Priority Data
Jun. 23, 2021 (CN) .......................... 202121407730.5

(51) Int. Cl.
*B32B 37/00* (2006.01)
*B29C 43/24* (2006.01)
(Continued)

(52) U.S. Cl.
CPC ............ *B32B 37/156* (2013.01); *B29C 43/24* (2013.01); *B29C 43/52* (2013.01);
(Continued)

(58) Field of Classification Search
None
See application file for complete search history.

(56) References Cited

U.S. PATENT DOCUMENTS 3,880,966 A * 4/1975 Zimmerman ............. B26F 1/28
264/479
5,478,516 A * 12/1995 Malm ..................... B29C 48/08
264/177.17
(Continued)

FOREIGN PATENT DOCUMENTS

CN     107866980 A     4/2018
CN     111660591 A     9/2020
(Continued)

OTHER PUBLICATIONS

CN112898702A_machine_translation (Year: 2021).*
Search Report of the parallel application BE202205061.

*Primary Examiner* — Michael N Orlando
*Assistant Examiner* — Abhishek A Patwardhan
(74) *Attorney, Agent, or Firm* — J.C. PATENTS

(57) ABSTRACT

A sheet production line comprises: a calender for laminating and calendaring a sheet blank; a first conveying mechanism arranged at a discharge end of the calender and used for carrying and conveying a semi-finished sheet product output from the calender, where the first conveying mechanism is a traction conveying mechanism; a section cutting mechanism arranged behind the discharge end of the calender in a traveling direction of the semi-finished sheet product; and a second conveying mechanism arranged at a discharge end of the section cutting mechanism in a traveling direction of the sheet sections, where the second conveying mechanism is a non-traction conveying mechanism.

11 Claims, 3 Drawing Sheets

(51) Int. Cl.
 *B29C 43/52* (2006.01)
 *B32B 38/00* (2006.01)
 *B32B 38/18* (2006.01)
 *B29L 7/00* (2006.01)

(52) U.S. Cl.
 CPC ...... *B32B 38/0004* (2013.01); *B32B 38/0036* (2013.01); *B32B 38/18* (2013.01); *B29L 2007/002* (2013.01)

(56) References Cited

U.S. PATENT DOCUMENTS

| | | | | |
|---|---|---|---|---|
| 5,776,281 | A * | 7/1998 | Evans | B29B 7/88 156/244.11 |
| 6,663,733 | B2 | 12/2003 | Nagaya | |
| 11,007,697 | B1 * | 5/2021 | Stokes, Jr. | B29C 59/046 |
| 2001/0048177 | A1 * | 12/2001 | Close | B29C 48/9135 264/912 |
| 2002/0190421 | A1 * | 12/2002 | Lin | B29C 43/24 264/232 |
| 2013/0101329 | A1 * | 4/2013 | Kanazawa | B26D 7/32 400/621 |
| 2020/0173108 | A1 * | 6/2020 | Zhou | D21G 1/0086 |

FOREIGN PATENT DOCUMENTS

| | | | | |
|---|---|---|---|---|
| CN | 112743883 | A | 5/2021 | |
| CN | 112898702 | A * | 6/2021 | ............. B29C 43/24 |

\* cited by examiner

SHEET PRODUCTION LINE

CROSS-REFERENCE TO RELATED APPLICATION

The present application claims priority to Chinese Patent Application No. 202121407730.5, filed on Jun. 23, 2021 and entitled "SHEET PRODUCTION LINE", the disclosure of which is hereby incorporated by reference in its entirety.

TECHNICAL FIELD

The present application relates to the technical field of sheet processing, in particular to a sheet production line.

BACKGROUND ART

A sheet production line may be used for processing and producing foamed floors, and generally comprises a feeder, an extruder, a mold, a calender, a conveying mechanism and a cutter.

The problems existing in sheet production lines and sheet production processes in the prior art are described by taking the following reference documents as examples.

Chinese Patent Publication No. CN111660591A discloses a preparation method and mechanism for a hollow sheet. The preparation method comprises: mixing materials through a feeder, extruding the mixed materials to a mold through an extruder, conveying sheet with an assist of a primary traction device, heating up through a drying oven in the conveying process, and cooling through a cooling device; and conveying the sheet to a cutting machine through a secondary traction device for section cutting.

Chinese Patent Publication No. CN111660591A discloses a structure and a process of a sheet processing mechanism which represent a sheet processing method in the prior art, and a similar process is also disclosed in CN112743883A.

The sheet processing method in the prior art is realized by adopting a way of firstly cooling and then cutting, and adopting a traction device in the cooling process to convey a semi-finished sheet product. However, a length of the whole traction conveying line is too long in the cooling process and the temperature of the semi-finished sheet product is too high, the high-temperature semi-finished sheet product will be compressed by the traction device in the traction conveying process. In such a manner, if the traction device is excessively adopted for assist conveying of the semi-finished sheet product, excessive deformation will be generated in the process of conveying the semi-finished sheet product to a rear end and will affect processing quality. However, limited by a technique of firstly cooling and then cutting, a non-traction conveying mechanism is not suitable for conveying of semi-finished sheet product of the whole sheet, which is easy to cause the semi-finished sheet product to be stuck.

As a result, finished sheet products processed by existing equipment and process easily fail to meet thickness requirements.

SUMMARY

To solve the problems in the prior art, an object of the present application is to provide a sheet production line, which improves layout of the sheet production line to reduce deformation caused by traction conveying in the sheet processing process, controls sheet thickness and improves sheet processing quality.

To achieve the aforementioned object, in some embodiments of the present application, the following technical solution is adopted:

In one aspect, the present application provides a sheet production line, comprising:

a calender for laminating and calendaring a sheet blank;

a first conveying mechanism arranged at a discharge end of the calender and used for carrying and conveying a semi-finished sheet product output from the calender, where the first conveying mechanism is a traction conveying mechanism;

a section cutting mechanism arranged behind the discharge end of the calender in a traveling direction of the semi-finished sheet product, and used for cutting the semi-finished sheet product which is continuous into sheet sections; and a second conveying mechanism arranged at a discharge end of the section cutting mechanism in a traveling direction of the sheet sections, where the second conveying mechanism is a non-traction conveying mechanism.

In some embodiments of the present application, the first conveying mechanism comprises a carrying mechanism and a tractor; the carrying mechanism is connected with the discharge end of the calender, and a gap for allowing the semi-finished sheet product to pass through is formed between the tractor and the carrying mechanism.

In some embodiments of the present application, the second conveying mechanism adopts one or more of a conveyor belt conveying mechanism, a roller type conveying mechanism and a chain type conveying mechanism.

In some embodiments of the present application, the sheet production line further comprises:

a front-end cutting mechanism connected to the first conveying mechanism, and the semi-finished sheet product is conveyed to the front-end cutting mechanism through the first conveying mechanism for cutting an end of the semi-finished sheet product;

the section cutting mechanism is arranged behind the front-end cutting mechanism in the traveling direction of the semi-finished sheet product.

In some embodiments of the present application, a cutting gap of the front-end cutting mechanism is greater than a cutting gap of the section cutting mechanism; cutting gaps are spaces each capable of allowing a to-be-cut object to pass through.

In some embodiments of the present application, a third conveying mechanism is arranged between the front-end cutting mechanism and the section cutting mechanism, and the third conveying mechanism comprises an upper traction roller and a lower traction roller which are arranged at intervals.

In some embodiments of the present application, the sheet production line further comprises a cooling mechanism arranged behind the section cutting mechanism in the traveling direction of the sheet sections.

In some embodiments of the present application, the cooling mechanism comprises a water tank in which cooling water is contained, and the second conveying mechanism passes through the cooling water.

In some embodiments of the present application, the cooling mechanism further comprises a water-removal air knife arranged at a side of the second conveying mechanism and positioned at an output end of the water tank through which the sheets pass.

In some embodiments of the present application, the cooling mechanism comprises at least one group of air coolers.

In some embodiments of the present application, the sheet production line further comprises an auxiliary cooling mechanism, and the auxiliary cooling mechanism comprises a first air blower, and/or a second air blower;

in the traveling direction of the sheet sections, the first air blower are arranged at a front end of the cooling mechanism in which the sheet sections enter, and the second air-cooling mechanism are arranged at an output end of the cooling mechanism through which the sheet sections pass.

In some embodiments of the present application, in a horizontal height, the water tank is lowered relative to the second conveying mechanism positioned at a front end and a rear end of the water tank; the second conveying mechanism comprises:

a first conveyor belt positioned at a rear end of the section cutting mechanism and is of a straight conveying structure;

a second conveyor belt positioned in the water tank, and comprises a descending section, a straight section and an ascending section; and a third conveyor belt positioned at the rear end of the water tank and is of a straight conveying structure.

In another aspect of the present application, a sheet production process using the sheet production line as described in any of the aforementioned embodiment is provided, the sheet production process at least comprises following steps:

calendaring and laminating: calendaring and laminating the sheet blank through the calender to form the semi-finished sheet product;

section cutting: performing section cutting on the semi-finished sheet product to obtain the sheet sections; and conveying the sheet sections backwards through a non-traction type conveying way, and cooling in a conveying process.

Compared with the prior art, the present application has the following advantages and positive effects:

The structure of existing sheet processing equipment is improved, the position of the cutting mechanism on the whole sheet production line is moved towards the calender, and a way of firstly cutting and then cooling is adopted. After being output from the calender, a sheet may be cut into small sheet sections before being conveyed over a long-distance. Requirements on conveying traction force of the small sheet sections are reduced, so that the cut conveying mechanism is changed into a non-traction conveying mechanism. In such a manner, deformation caused by traction conveying on the sheet may be reduced, the sheet thickness is precisely controlled, and the sheet processing quality is improved.

BRIEF DESCRIPTION OF DRAWINGS

In order to illustrate technical solutions of embodiments of the present application more clearly, the following will make a brief introduction to the drawings that are used in the description of the embodiments. Obviously, the drawings in the following description are only some of embodiments of the present application, and for those of ordinary skill in the art, other drawings can also be derived from these drawings without creative labor.

In the drawings.

Figure 1:
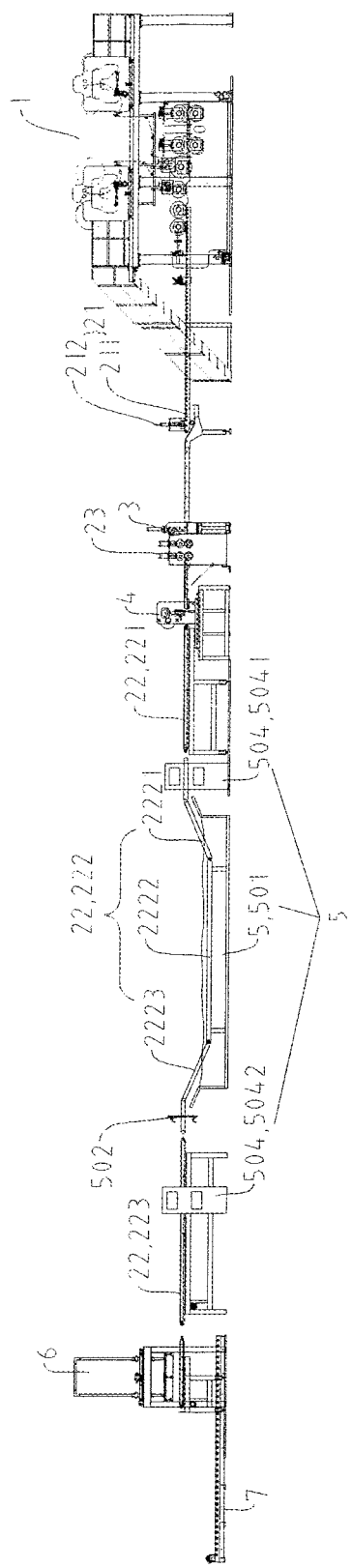
FIG. 1 is a schematic structural diagram of a sheet production line in one embodiment provided by the present application.

1, calender;
21, first conveying mechanism; 211, carrying mechanism; 212, tractor; 22, second conveying mechanism; 221, first conveyor belt; 222, second conveyor belt; 2221, descending section; 2222, straight section; 2223, ascending section; 223, third conveyor belt; 23, third conveying mechanism; 231, upper traction roller; 232, lower traction roller;
3, front-end cutting mechanism;
4, section cutting mechanism;
5, cooling mechanism; 501, water tank; 502, water-removal air knife; 503, air cooler; 504, auxiliary cooling mechanism; 5041, first air blower; 5042, second air blower;
6, transplanting machine; and
7, ground roller conveying mechanism.

DETAILED DESCRIPTION OF THE EMBODIMENTS

In order to make the technical problems, technical solutions and beneficial effects clearer and more obvious, the present application will be further illustrated in detail in combination with accompanying drawings and embodiments hereinafter. It should be understood that the specific embodiments described here are only used to explain the present application, and not used to limit the present application.

It should be noted that when an element is referred to as being "disposed on", or "arranged on" another element, it can be directly on the other element or indirectly on the other element. When an element is said to be "connected to" another element, it can be directly connected to the other element or indirectly connected to the other element.

It is to be understood that orientation or position relationships indicated by terms "upper", "lower", "longitudinal" and the like are orientation or position relationships shown in the drawings, "front" and "back" are directions based on a sheet layer traveling in the calender, which are merely for describing the present application and simplifying the description rather than indicating or implying that the specified apparatus or element must have a particular orientation or be constructed and operated in a particular orientation, thus should not be interpreted as limitations to the present application. The terms "first" and "second" are merely descriptive, and cannot be interpreted as indicating the relative importance.

It should be noted that the "non-traction conveying mechanism" in the present application is a conveying mechanism not additionally providing traction force, for example, a conveyor belt, a carrier roller, and the like. The "traction conveying mechanism" in the present application is a conveying mechanism additionally providing traction force to assist conveying, for example, a tractor is additionally arranged in the non-traction conveying mechanism to provide the traction force. The "cutting mechanism" in the present application may adopt a device for sheet cutting in the prior art, and a specific structural configuration thereof is not limited.

An embodiment of the present application provides a sheet production line which may be used for processing various sheets.

The sheet production line comprises a feeder, an extruder, a mold, a calender 1, a first conveying mechanism 21, a section cutting mechanism 4, a second conveying mechanism 22, a transplanting machine 6, a ground roller conveying mechanism 7, and the like.

The feeder, the extruder and the mold belong to front-end equipment, and are not shown in the figures. Powder for sheet processing is output to the extruder after being mixed through the feeder, and then is output to the mold through the extruder, and is extrusion-molded through the mold to form a primary blank.

Following definitions are made in the embodiments: a sheet blank is output from the mold, a semi-finished sheet product is output from the calender 1, and sheet sections are output from the section cutting mechanism 4.

The calender 1 is connected with a discharge end of the mold and is used for processing a sheet blank. The calender 1 comprises a set of calendaring rollers and a laminating mechanism. The sheet blank processed through the mold passes through gaps of the calendaring rollers, and is laminated with a laminating film. According to requirements of processing, the laminating film may be a color film or a wear-resistant film. The sheet blank is laminated and calendared to form a semi-finished sheet product. The semi-finished sheet product is cooled and cut to form sheet sections.

The first conveying mechanism 21 is arranged at a discharge end of the calender 1 and is used for carrying and conveying the semi-finished sheet product output from the calender 1. The semi-finished sheet product output from the calender 1 are a whole-piece blank generally with a fixed width and a continuous length. The semi-finished sheet product is continuously discharged from the calender 1 and need to be continuously conveyed backwards through the first conveying mechanism 21. In such a manner, the semi-finished sheet product may be prevented from being excessively stacked at the discharge end of the calender 1 and affecting processing quality and efficiency. The continuous semi-finished sheet product has a certain weight and thickness, and therefore, the first conveying mechanism 21 generally adopts a traction conveying mechanism, so that the effect of dragging the semi-finished sheet product backwards is achieved through traction force to guarantee conveying continuity of the semi-finished sheet product.

Figure 3:
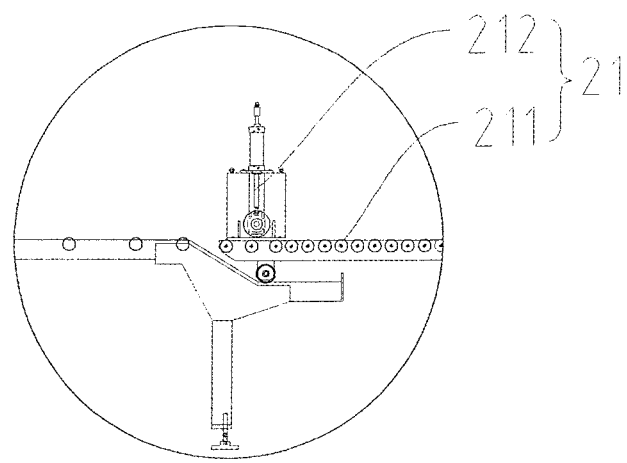
FIG. 3 is an enlarged view of a first conveying mechanism provided in an embodiment of the present application.

Specifically, in some embodiments of the present application, as shown in FIG. 3, the first conveying mechanism 21 adopts the traction conveying mechanism, comprising a carrying mechanism 211 and a tractor 212. The carrying mechanism 211 may adopt a continuous carrier roller and is connected with the discharge end of the calender 1. A gap is formed between the tractor 212 and the carrying mechanism 211, and the semi-finished sheet product output from the calender 1 passes through from the gap. Power provided by the tractor 212 is used for assisting conveying of the semi-finished sheet product.

The section cutting mechanism 4 is arranged behind the discharge end of the calender 1 in a traveling direction of the semi-finished sheet product, and is specifically arranged behind the first conveying mechanism 21 in the traveling direction of the semi-finished sheet product. The section cutting mechanism 4 is used for cutting the semi-finished sheet product which is continuous into small sheet sections.

The second conveying mechanism 22 is arranged at a discharge end of the section cutting mechanism 4 and adopts a non-traction conveying mechanism. The second conveying mechanism 22 is used for conveying the sheet sections after cutting. Due to a reduced length and reduced weight of the sheet sections, the sheet sections can be continuously conveyed without adopting a traction conveying mechanism.

In some embodiments of the present application, the second conveying mechanism 22 adopts one or more of a conveyor belt conveying mechanism, a roller type conveying mechanism and a chain type conveying mechanism. Based on conveying requirements and setting of rear-end equipment, the second conveying mechanism 22 may adopt a sectional design, and each section may select a configuration form of the aforementioned conveying mechanisms based on the requirements.

Further, in some embodiments of the present application, the sheet production line further comprises a front-end cutting mechanism 3 which is connected to the first conveying mechanism 21, so that the semi-finished sheet product is conveyed to the front-end cutting mechanism 3 through the first conveying mechanism 21. The section cutting mechanism 4 is arranged behind the front-end cutting mechanism 3 in the traveling direction of the semi-finished sheet product. The front-end cutting mechanism 3 is used for cutting an end of the semi-finished sheet product. Affected by various factors, such as a temperature of the calender 1, discharge amount of the mold, and the like, the end of the semi-finished sheet product generally become uneven such as waves, which should be cut off and cannot be taken as parts of the finished sheet product, and belong to waste.

Further, to guarantee smooth cutting of a front end of the semi-finished sheet product and section cutting of the semi-finished sheet product, in some embodiments of the present application, a cutting gap of the front-end cutting mechanism 3 is greater than that of the section cutting mechanism 4. The cutting gap is a space capable of allowing a to-be-cut object to pass through. Specifically, a cutting mechanism generally comprises a carrying mechanism and a cutting knife, and the semi-finished sheet product passes through a gap between the cutting knife and the carrying mechanism. The front end of the semi-finished sheet product is wavy, and a rear end of the semi-finished sheet product is flat, so that a width, in a thickness direction, of the front end of the semi-finished sheet product is greater than that, in the thickness direction, of the rear end of the semi-finished sheet product. Therefore, the cutting gap of the front-end cutting mechanism 3 needs to be configured for allowing the front end of the semi-finished sheet product to pass through, and the cutting gap of the section cutting mechanism 4 needs to be configured for allowing the rear-end of the semi-finished sheet product to pass through.

Sheet cut by the front-end cutting mechanism 3 is still a whole-piece sheet. To guarantee smooth traction, in some embodiments of the present application, a third conveying mechanism 23 which adopts a traction conveying mechanism is arranged between the front-end cutting mechanism 3 and the section cutting mechanism 4.

Figure 4:
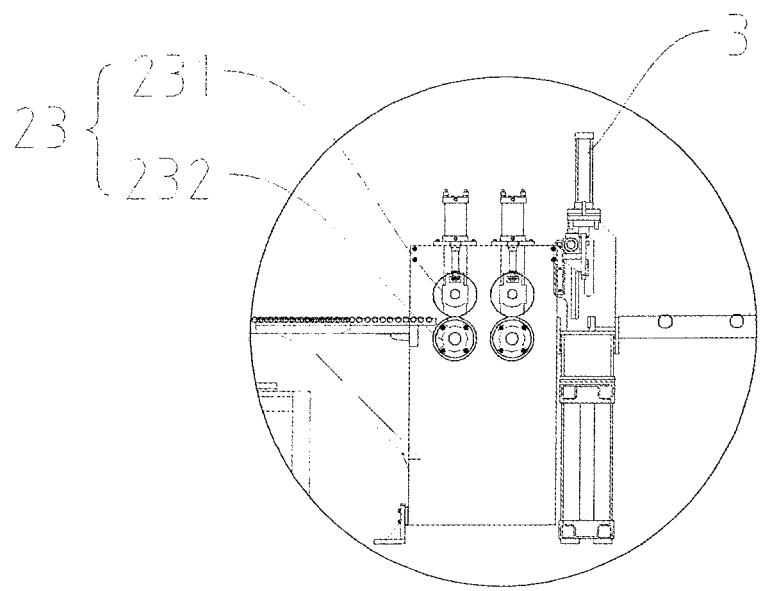
FIG. 4 is an enlarged view of a third conveying mechanism provided in an embodiment of the present application.

In some embodiments of the present application, as shown in FIG. 4, the third conveying mechanism 23 comprises an upper traction roller 231 and a lower traction roller 232 which are arranged at intervals. The semi-finished sheet product cut by the front-end cutting mechanism passes through a gap between the upper traction roller 231 and the lower traction roller 232, and is conveyed through rotating force of the traction rollers. Optionally, two sets of the upper traction roller 231 and the lower traction roller 232 are respectively arranged.

In a sheet processing process, a temperature of the sheet blank discharged from the mold is about 200° C. After being processed through the calender 1, the temperature is reduced to 150-170° C., and further cooling is required. In some embodiments of the present application, the sheet production line further comprises a cooling mechanism 5 which is arranged behind the section cutting mechanism 4 in the traveling direction of the sheet sections. The cooling mechanism 5 is used for cooling the sheet sections after cutting. Based on the configuration requirements, the cooling mechanism 5 may have various implementation forms.

A first implementation refers to FIG. 1.

In some embodiments of the first implementation, the cooling mechanism comprises a water tank 501 in which cooling water is contained, and the second conveying mechanism 22 passes through the cooling water. The cooling water adopts circulating water to guarantee cooling and shaping effect.

After being water-cooled, the sheet sections have water on surfaces. In some embodiments of the present application, to solve the problem that the sheet have water, the cooling mechanism 5 further comprises a water-removal air knife 502 which is arranged at a side of the second conveying mechanism 22 and is positioned at an output end of the water tank 501 through which the sheet sections pass.

Figure 2:
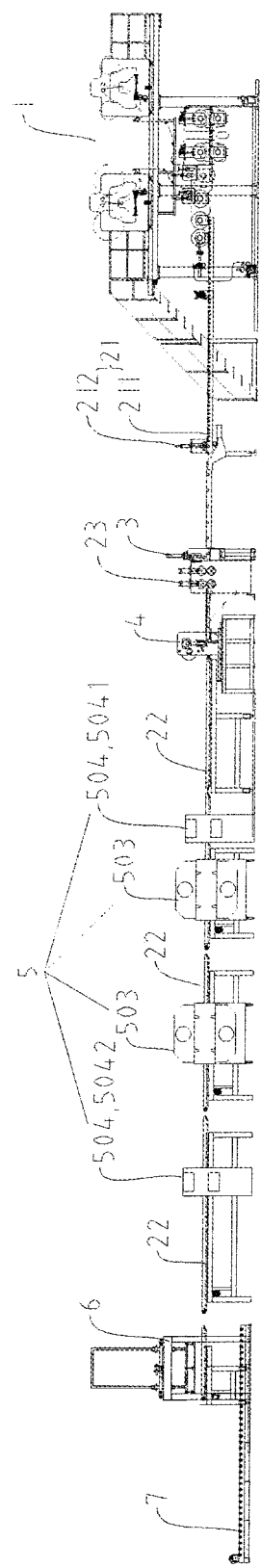
FIG. 2 is a schematic structural diagram of a sheet production line in another embodiment provided by the present application.

A second implementation refers to FIG. 2.

In some embodiments of the second implementation, the cooling mechanism 5 comprises at least one group of air coolers 503. In the present embodiment, the cooling mechanism comprises two groups of air coolers 503.

Specifically, the air coolers 503 are arranged at one side of the second conveying mechanism 22 in a conveying direction of the sheet sections. A temperature of air blown out from the air coolers 503 is lower than a surrounding environment temperature to achieve the purpose of quickly cooling.

In the two implementations, generally speaking, the air coolers of the second implementation may be adopted to achieve the required cooling effect. However, when the cooling effect needs to be reinforced, for example, when a conveying speed of the second conveying mechanism 22 is too high, the first implementation may be selected.

In some embodiments of the present application, the sheet production line further comprises an auxiliary cooling mechanism 504 which comprises a first air blower 5041, and/or a second air blower 5042, and the first air blower 5041 and the second air blower 5042 blow towards an end surface of the second conveying mechanism 22.

As an auxiliary cooling mechanism, the first air blower 5041 and the second air blower 5042 do not refrigerate cold air, and only blow out air at the surrounding environment temperature for auxiliary cooling.

In the traveling direction of the sheet sections, the first air blower 5041 may be arranged at a front end of the cooling mechanism 5 in which the sheet sections enter, and the second air-cooling mechanism 5042 may be arranged at an output end of the cooling mechanism 5 through which the sheet sections pass.

To adapt to the cooling mechanism at a rear end of the second conveying mechanism 22, in some embodiments of the present application, the second conveying mechanism 22 comprises a plurality of adjacent conveying sections.

Refer to FIG. 1, in the first implementation of the cooling mechanism 5, in a horizontal height, the water tank 501 is lowered relative to the second conveying mechanism 22 which is positioned at a front end and a rear end of the water tank. To adapt to the structure, the second conveying mechanism 22 comprises (taking a conveyor belt which is adopted as the second conveying mechanism 22 as an example):

a first conveyor belt 221 which is positioned at a rear end of the section cutting mechanism 4 and is used for conveying the sheet sections to the rear end, where the first conveyor belt 221 may be a whole conveyor belt, if the length is too long, a sectional structure may be adopted, and the whole first conveyor belt 221 is a straight conveying structure; and the first air blower 5041 is arranged on a side of the first conveyor belt 221;

a second conveyor belt 222 which is positioned in the water tank 501, and comprises a descending section 2221, a straight section 2222 and an ascending section 2223; and a third conveyor belt 223 which is positioned at the rear end of the water tank 501 and is used for conveying the cooled sheet sections to the transplanting machine 6, where the third conveyor belt 223 may be the whole conveyor belt; if the length is too long, a sectional structure may be adopted, and the whole third conveyor belt 223 is a straight conveying structure; and the second air blower 5042 is arranged at a side of the third conveyor belt 223.

Refer to FIG. 2, in the second implementation, the second conveying mechanism 22 is a straight conveying mechanism which may be a whole conveyor belt. If the length is too long, a sectional structure may be adopted.

Another aspect of the present application provides a sheet production process, comprising following steps:

mixing: mixing materials for sheet processing to obtain mixed materials;

extruding: introducing the mixed materials into the extruder to form extruded materials;

mold-stripping: introducing the extruded materials into the mold to be processed into a sheet blank;

calendaring and laminating: calendaring and laminating the sheet blank through the calender to form a semi-finished sheet product;

section cutting: performing section cutting on the semi-finished sheet products to obtain sheet sections; and conveying the sheet sections backwards through a non-traction type conveying way, and cooling in the conveying process.

Further, the sheet production process further comprises front-end cutting, and the front-end cutting mechanism 3 cuts uneven sheet waste at a front end of the semi-finished sheet product. After front-end cutting, section cutting is performed.

Sheets processed through the whole production line are conveyed and stacked backwards through the transplanting machine 6.

The above are only preferred embodiments of the present application, and are not intended to limit the present application. Any modifications, equivalent substitutions, improvements, etc. made within the spirit and principles of the present application are included in the scope of protection of the present application.

The invention claimed is:

1. A sheet production line, comprising:
   a calender for laminating and calendering a sheet blank, wherein the calender comprises a set of calendering rollers and a laminating device, the sheet blank passes through a gap between the calendering rollers and is laminated via the laminating device with a laminating film to form a semi-finished sheet product;
   a first conveying device arranged at a discharge end of the calender and used for carrying and conveying the semi-finished sheet product output from the calender, where the first conveying device is a traction conveying device;

a section cutting device arranged behind the discharge end of the calender in a traveling direction of the semi-finished sheet product, and used for cutting the semi-finished sheet product which is continuous into sheet sections;

a second conveying device arranged at a discharge end of the section cutting device in a traveling direction of the sheet sections, where the second conveying device is a non-traction conveying device; and a cooling device arranged behind the section cutting device in the traveling direction of the sheet sections; the cooling device comprises a water tank containing cooling water, and the second conveying device passes through the cooling water.

2. The sheet production line according to claim 1, wherein the first conveying device comprises a carrying structure and a tractor; the carrying structure is connected with the discharge end of the calender, and a gap for allowing the semi-finished sheet product to pass through is formed between the tractor and the carrying structure.

3. The sheet production line according to claim 1, wherein the second conveying device adopts one or more of a conveyor belt conveying device, a roller type conveying device and a chain type conveying device.

4. The sheet production line according to claim 1, further comprising:

a front-end cutting device connected to the first conveying device, and the semi-finished sheet product is conveyed to the front-end cutting device through the first conveying device for cutting an end of the semi-finished sheet product;

the section cutting device is arranged behind the front-end cutting device in the traveling direction of the semi-finished sheet product.

5. The sheet production line according to claim 4, wherein a cutting gap of the front-end cutting device is greater than a cutting gap of the section cutting device; cutting gaps are spaces each capable of allowing a to-be-cut object to pass through.

6. The sheet production line according to claim 4, wherein a third conveying device is arranged between the front-end cutting device and the section cutting device, and the third conveying device comprises an upper traction roller and a lower traction roller which are arranged at intervals.

7. The sheet production line according to claim 1, wherein the cooling device further comprises a water-removal air knife arranged at a side of the second conveying device and positioned at an output end of the water tank through which the sheet sections pass.

8. The sheet production line according to claim 1, wherein the cooling device comprises at least one group of air coolers.

9. The sheet production line according to claim 1, further comprising an auxiliary cooling device, and the auxiliary cooling device comprises a first air blower, and/or a second air blower;

in the traveling direction of the sheet sections, the first air blower is arranged at a front end of the cooling device in which the sheet sections enter, and the second air blower is arranged at an output end of the cooling device through which the sheet sections pass.

10. The sheet production line according to claim 1, wherein, in a horizontal height, the water tank is lowered relative to the second conveying device positioned at a front end and a rear end of the water tank; the second conveying device comprises:

a first conveyor belt positioned at a rear end of the section cutting device and is of a straight conveying structure;

a second conveyor belt positioned in the water tank, and comprises a descending section, a straight section and an ascending section; and a third conveyor belt positioned at the rear end of the water tank and is of a straight conveying structure.

11. A sheet production process using the sheet production line according to claim 1, at least comprising following sequential steps:

calendering and laminating: calendering and laminating the sheet blank through the calender to form the semi-finished sheet product;

section cutting: performing section cutting on the semi-finished sheet product to obtain the sheet sections; and conveying the sheet sections backwards through a non-traction type conveying way, and cooling the sheet sections in a conveying process.

* * * * *